United States Patent [19]

Barton

[11] Patent Number: 5,596,907
[45] Date of Patent: Jan. 28, 1997

[54] ANTIFRICTION ELEMENT FOR USE BETWEEN RELATIVELY SLIDING COMPONENTS OF AN ADJUSTABLE STEERING COLUMN

[75] Inventor: Laurence G. H. Barton, Warwickshire, England

[73] Assignee: The Torrington Company, Torrington, Conn.

[21] Appl. No.: 263,857

[22] Filed: Jun. 22, 1994

[30] Foreign Application Priority Data

Jul. 9, 1993 [GB] United Kingdom .................. 9314263

[51] Int. Cl.$^6$ .................................................. B62D 1/18
[52] U.S. Cl. .............................................. 74/493; 74/531
[58] Field of Search ...................... 74/493, 531; 280/777

[56] References Cited

U.S. PATENT DOCUMENTS

| 4,648,624 | 3/1987 | Mouhot et al. | 280/775 |
| 4,732,050 | 3/1988 | Vollmer | 74/493 |

FOREIGN PATENT DOCUMENTS

| 0564898A2 | 10/1993 | European Pat. Off. . |
| 0600700A1 | 6/1994 | European Pat. Off. . |
| 58-54241 | 3/1983 | Japan | 267/158 |
| 2033855 | 5/1980 | United Kingdom . |
| 2107439 | 4/1983 | United Kingdom . |
| 2113164 | 8/1983 | United Kingdom . |
| 2113629 | 8/1983 | United Kingdom . |
| 2259132 | 3/1993 | United Kingdom . |
| 2279728 | 1/1995 | United Kingdom . |

*Primary Examiner*—Rodney H. Bonck
*Assistant Examiner*—David Fenstermacher
*Attorney, Agent, or Firm*—Michael H. Minns

[57] ABSTRACT

An antifriction element for use between two relatively sliding metal components of an adjustable steering column is locatable between the two components and is formed such that, in an unclamped state of the components, two opposed resilient angled flanges act to urge the components away from contact with one another to allow relative free sliding of the components on the element, which is of plastics material, and, in a clamped state of the components, the flanges are deflected to allow direct contact between surfaces of the metal components to provide the clamping friction.

13 Claims, 3 Drawing Sheets

5,596,907

ANTIFRICTION ELEMENT FOR USE BETWEEN RELATIVELY SLIDING COMPONENTS OF AN ADJUSTABLE STEERING COLUMN

BACKGROUND OF THE INVENTION

This invention relates to an antifriction element for use between relatively sliding components of an adjustable steering column construction for a vehicle.

With known constructions of clamping mechanisms for adjustable steering columns, whether rake and/or reach adjustable, the clamping mechanism allows relative sliding between one part of the steering column and another part of it in an unclamped condition, while the two parts are clamped together once the desired location has been set by the driver. The two parts are typically metal and so the relatively sliding metal faces can give an unsatisfactory "feel" to the user.

The foregoing illustrates limitations known to exist in present adjustable steering columns. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a steering column clamping mechanism for an adjustable steering column comprising: a first clamp member; a second clamp member slidable relative to the first clamp member, the first clamp member and the second clamp member being in contact with one another when the steering column is in a clamped state; and an antifriction element interposed between the first clamp member and the second clamp member, the antifriction element biasing the first clamp member and the second clamp member out of contact with one another when the steering column is in an unclamped state, the first clamp member and the second clamp member each being in sliding contact with the antifriction element when the steering column is in the unclamped state.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

According to the present invention, there is provided an antifriction element for use between relatively sliding components of an adjustable steering column construction for a vehicle, the element being locatable between two said components and being formed such that, in an unclamped state of the components, a part of the element acts to urge the components away from contact with one another to allow relative free sliding of the components on the element and, in a clamped state of the components, said part is deflected to allow direct contact between surfaces of the components to provide the clamping friction.

The invention also extends to an adjustable steering column incorporating an antifriction element essentially as just defined.

Preferably, the antifriction element is formed of a plastics material, the relatively sliding components being of metal.

The element can be in the form of a flanged, slotted liner, each flange of the liner having a degree of resilience and being formed in such a way as to constitute said part as hereinbefore defined.

Figure 1:
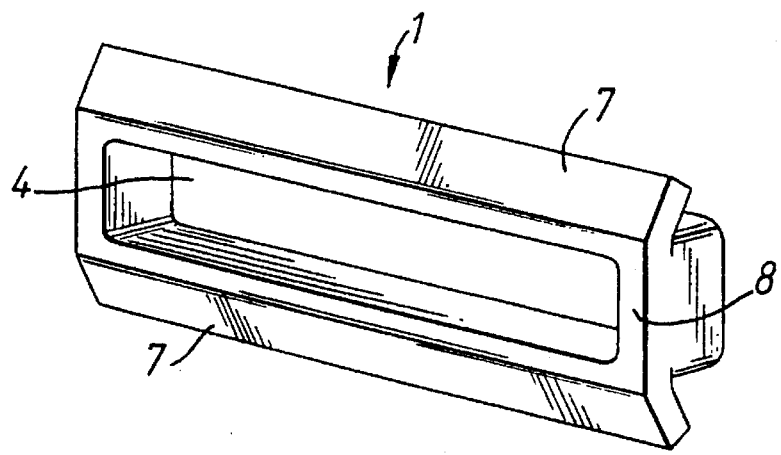
FIG. 1 is a perspective view of an antifriction element for use between relatively sliding components of an adjustable steering column construction for a vehicle.

Referring to FIG. 1, the antifriction element illustrated is in the form of a slotted, flanged plastics liner 1 for interposition between two relatively sliding components 2, 3, respectively, of an adjustable steering column for a vehicle.

Figure 4:
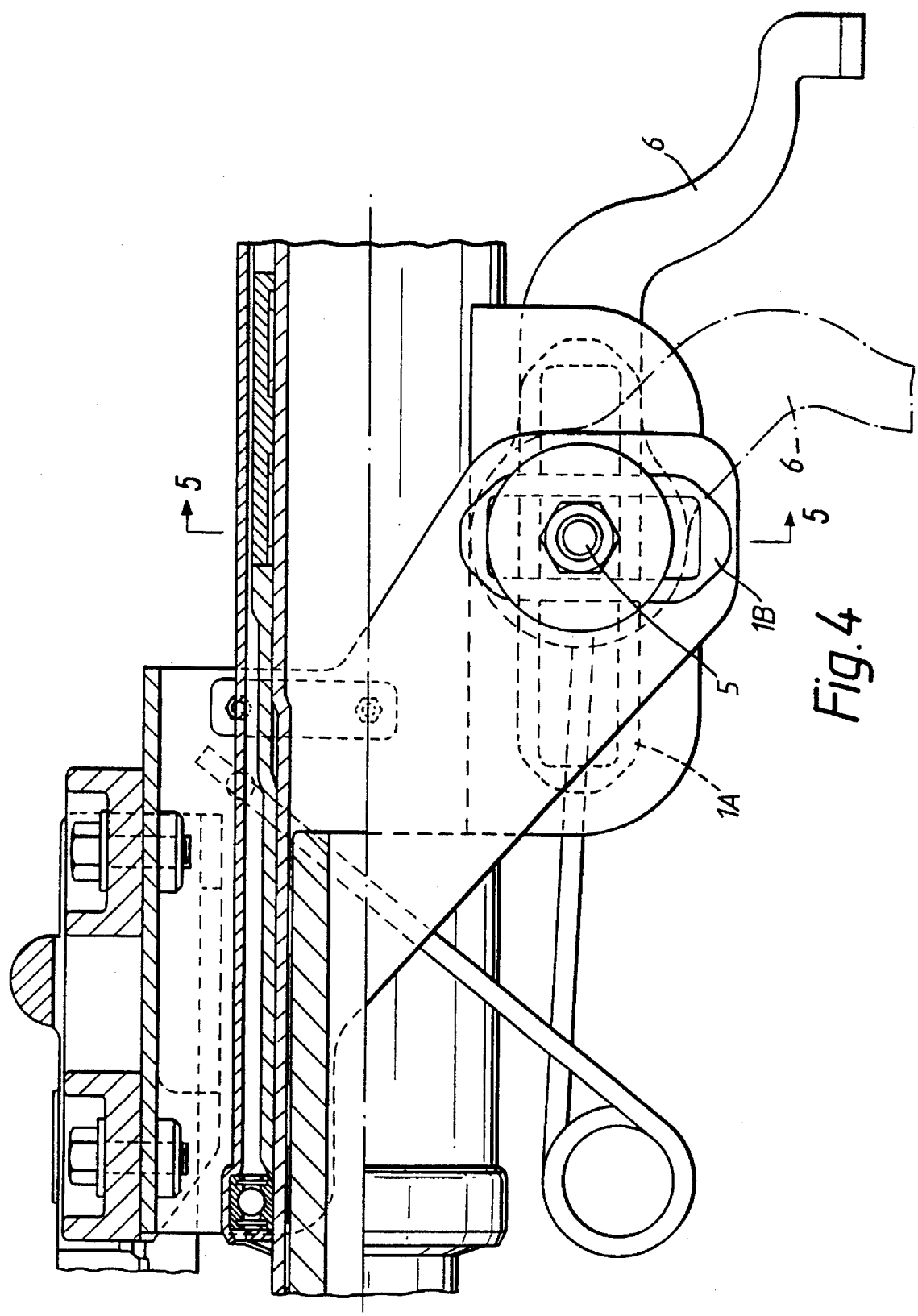
FIG. 4 is a side view, partly in section, which shows an adjustable steering column incorporating two such antifriction elements, one being for a linear adjustment of the steering column and the other being for a vertical adjustment of the steering column.

The liner 1 has a substantially rectangular form with a longitudinal slot 4 to accommodate an adjustment bar 5 of the adjustment mechanism, the adjustment bar 5 being linked to a clamp handle 6 (FIGS. 4, 5) of the clamping mechanism. As shown in FIG. 4, two liners 1 are provided, one of them (1A) being for linear or reach adjustment of the steering column and the other (1B) being for vertical or rake adjustment of the column.

As best seen in FIG. 1, the liner 1 has two opposing angled flanges 7 extending in its free or uninstalled state at an angle from the plane of an upper surface 8 of the liner 1.

Figure 2:
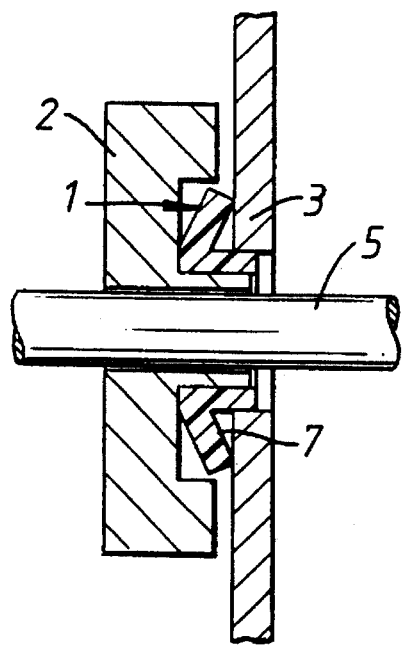
FIG. 2 illustrates the antifriction element of FIG. 1 located between two such relatively sliding components in an unclamped condition.

As illustrated in FIGS. 2 to 5, the plastics liners 1 are located between the two relatively sliding metal components or clamp members 2, 3 and FIG. 2 shows that, when the clamping mechanism is in its unclamped condition, the angled flanges 7 of the liner 1 act to urge the components 2 and 3 away from one another so that relative sliding takes place on the plastics surface 8 of the liner 1 in a low friction manner (rather than the greater frictional reaction as would be the case of relatively sliding metal components in direct contact with one another).

Figure 3:
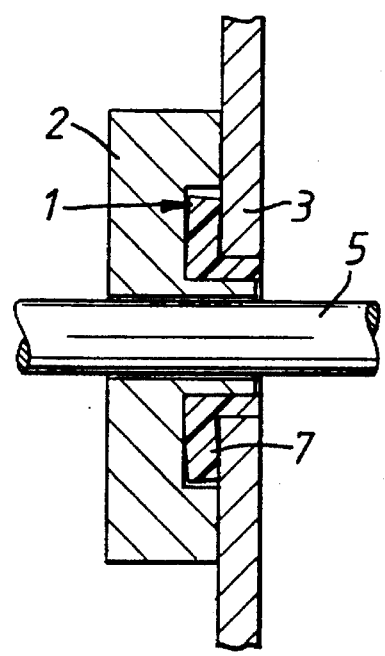
FIG. 3 is a view similar to FIG. 2 but showing the clamped condition.

FIG. 3 illustrates the components in the clamped condition of the mechanism and here it will be seen that the angled flanges 7 have been deflected towards the plane of the surface 8 by the components 2 and 3 being pressed one against the other, so that the adjacent metal surfaces of the components 2 and 3 contact one another to provide a high resistance clamp force in a metal-to-metal contact.

As previously stated, FIG. 4 shows two such liners 1 although it will be appreciated that only one such liner 1 need be provided for a mechanism which only adjusts in one plane.

Figure 5:
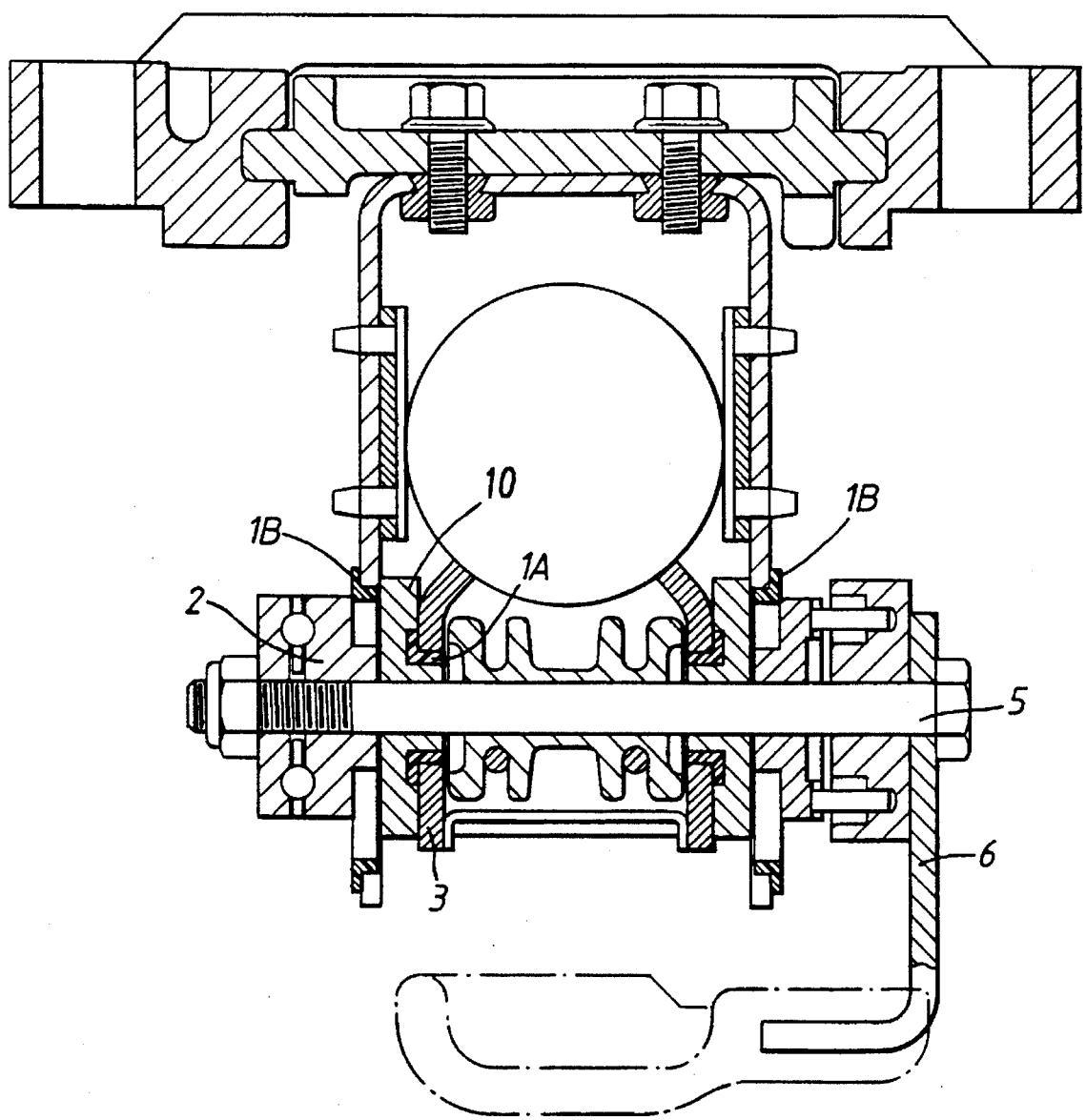
FIG. 5 is an end view in section of the adjustable steering column illustrated in FIG. 4.

The part labelled 10 in FIG. 5 is corresponds to the metal component 3 which is clamped into contact with the metal component 2 for vertical adjustment of the steering column and to the metal component 2 which comes into contact with the metal component 3 for the linear adjustment of the steering column. Liner 1A being interposed between parts 3 and 10. Liner 1B being interposed between parts 2 and 10.

Thus, the present construction of the element allows for a dual purpose slotted liner 1 which allows low friction plastics contact for adjustment and high friction metal contact for positive locking of the mechanism.

Having described the invention, what is claimed is:

1. A steering column clamping mechanism for an adjustable steering column comprising:

a first clamp member;

a second clamp member slidable relative to the first clamp member, the first clamp member and the second clamp member being in contact with one another when the steering column is in a clamped state; and an antifriction element interposed between the first clamp member and the second clamp member, the antifriction element biasing the first clamp member and the second clamp member out of contact with one another when the steering column is in an unclamped state, the first clamp member and the second clamp member each being in sliding contact with the antifriction element when the steering column is in the unclamped state, the antifriction element being a slotted liner having an elongated slot therein and having at least one flange extending therefrom, the at least one flange biasing the clamp members away from contact with one another when the steering column is in the unclamped state, the at least one flange being elastically deformed to allow direct contact between said clamp members when said steering column is in the clamped state.

2. The steering column clamping mechanism according to claim 1, wherein the number of flanges is two.

3. The steering column clamping mechanism according to claim 2 wherein the slotted liner has a first surface and a second surface, one of said clamping members being in sliding contact with said first surface when the steering column is in the unclamped state, each flange extending from said first surface.

4. The steering column clamping mechanism according to claim 3 wherein each flange when in a free state extends at an angle to the plane in which said first surface lies.

5. A steering column clamping mechanism for an adjustable steering column comprising:

a first clamp member;

a second clamp member slidable relative to the first clamp member, the first clamp member and the second clamp member being in contact with one another when the steering column is in a clamped state; and an antifriction element interposed between the first clamp member and the second clamp member, the first clamp member and the second clamp member each being in sliding contact with the antifriction element when the steering column is in an unclamped state, the antifriction element being a slotted member having an elongated slot therein and having two flanges extending therefrom, the slotted member having a first surface and a second surface, each flange extending from said first surface, the slot being located between the flanges, the flanges biasing the clamp members away from contact with one another when the steering column is in the unclamped state, one of said clamp members being in sliding contact with said first surface when the steering column is in the unclamped state, the flanges being elastically deformed when the steering column is in the clamped condition.

6. A steering column clamping mechanism for an adjustable steering column, the adjustable steering column being reach and rake adjustable, the steering clamping mechanism comprising:

a plurality of clamp members, one clamp member being slidable relative to an adjacent clamp member, the one clamp member being in contact with the adjacent clamp member when the steering column is in a clamped state;

two antifriction elements, each antifriction element being interposed between two clamp members, each antifriction element having an elongated slot, the antifriction elements being oriented such that the elongated slot in one antifriction element is 90° to the elongated slot in the other antifriction element, an interposed antifriction element biasing adjacent clamp members out of contact with one another when the steering column is in an unclamped state, each clamp member being in sliding contact with at least one antifriction element when the steering column is in the unclamped state.

7. The steering column clamping mechanism according to claim 6 wherein the antifriction element has at least one flange extending therefrom, the at least one flange biasing adjacent clamp members away from contact with one another when the steering column is in the unclamped state.

8. The steering column clamping mechanism according to claim 6 wherein the number of clamp members is three, an antifriction element being interposed between the first and the second clamp members, the other antifriction element being interposed between the second and the third clamp members.

9. The steering column clamping mechanism according to claim 6 wherein the number of clamp members is four, an antifriction element being interposed between the first and second clamp members, the other antifriction element being interposed between the third and fourth clamp members.

10. An antifriction element for use between relatively sliding components of an adjustable steering column construction for a vehicle, the antifriction element being located between two said components and being formed such that, in an unclamped state of the components, a segment of the element acts to urge the components away from contact with one another to allow relative free sliding of the components on the antifriction element and, in a clamped state of the components, said segment is deflected to allow direct contact between surfaces of the components to provide the clamping friction, the antifriction element having an elongated slot therein.

11. The antifriction element according to claim 10 wherein said element is made of plastics material.

12. The antifriction element according to claim 10 wherein said element is in the form of a flanged, slotted liner having at least one flange, the at least one flange of the liner having a degree of resilience and being formed in such a way as to constitute said segment.

13. The antifriction element according to claim 12 wherein two said flanges are provided, one on each opposing side of a surface of the liner on which one of said components is intended to slide, the flanges extending when in the unclamped state of the components at an angle to said surface of said liner.

* * * * *